Feb. 20, 1973   L. G. JORGENSEN   3,717,535
SPLICING DEVICE

Filed Nov. 20, 1970   3 Sheets-Sheet 1

Inventor
Leif G. Jorgensen
By Richard W. Carpenter
Attorney

Inventor
Leif G. Jorgensen
By Richard W. Carpenter
Attorney

Feb. 20, 1973  L. G. JORGENSEN  3,717,535
SPLICING DEVICE

Filed Nov. 20, 1970  3 Sheets-Sheet 3

Inventor
Leif G. Jorgensen
By *Richard W. Carpenter*
Attorney

United States Patent Office 3,717,535
Patented Feb. 20, 1973

3,717,535
SPLICING DEVICE
Leif G. Jorgensen, 211 S. Main St.,
Lombard, Ill. 60148
Filed Nov. 20, 1970, Ser. No. 91,417
Int. Cl. B31f 5/06; G03d 15/04
U.S. Cl. 156—443                                    4 Claims

ABSTRACT OF THE DISCLOSURE

In a device for splicing a pair of motion picture film strips, or the like, by wrapping them with a band of adhesive tape from a roll, a mechanism for dispensing a predetermined length of tape.

---

This invention relates to film splicers of the type used to splice motion picture film strips or magnetic tape strips and disclosed in U.S. Letters Pat. No. 3,450,589, and the present invention relates to an improved means and mechanism for delivering a predetermined length of tape for use in the splice.

An object of the invention is to provide, in a film splicing apparatus of the type wherein a band of adhesive tape is wrapped around a pair of adjacent ends of film strips, a mechanism for automatically delivering a predetermined length of tape.

A more specific object of the invention is the provision, in a splicing device, of a tape dispensing mechanism which will grip and pull the free end of the tape from a roll to the film strip ends and then release the tape to allow the dispenser to move out of the way and sever the tape.

These and other objects of the invention will be apparent from an examination of the following description and drawings, wherein.

It will be understood that, for purposes of clarity, certain elements have been eliminated from certain views where they are illustrated to better advantage in other views.

Figure 1:
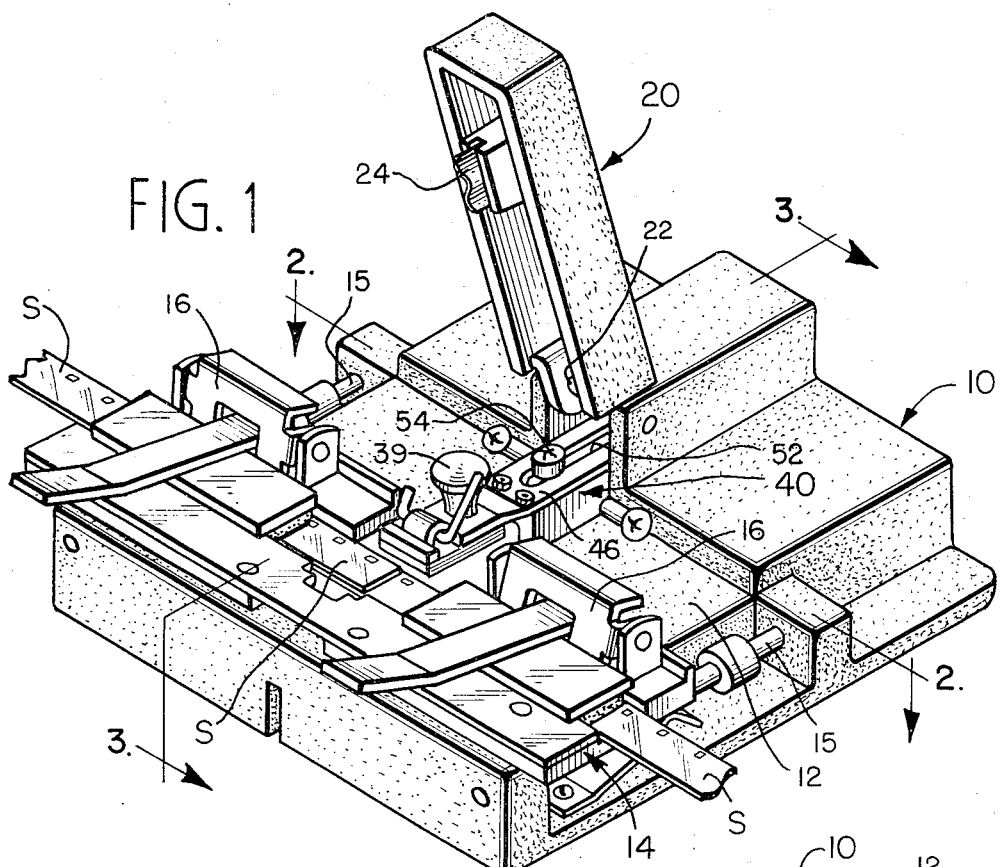
FIG. 1 is a perspective view of a film splicer embodying features of the invention.
Figure 3:
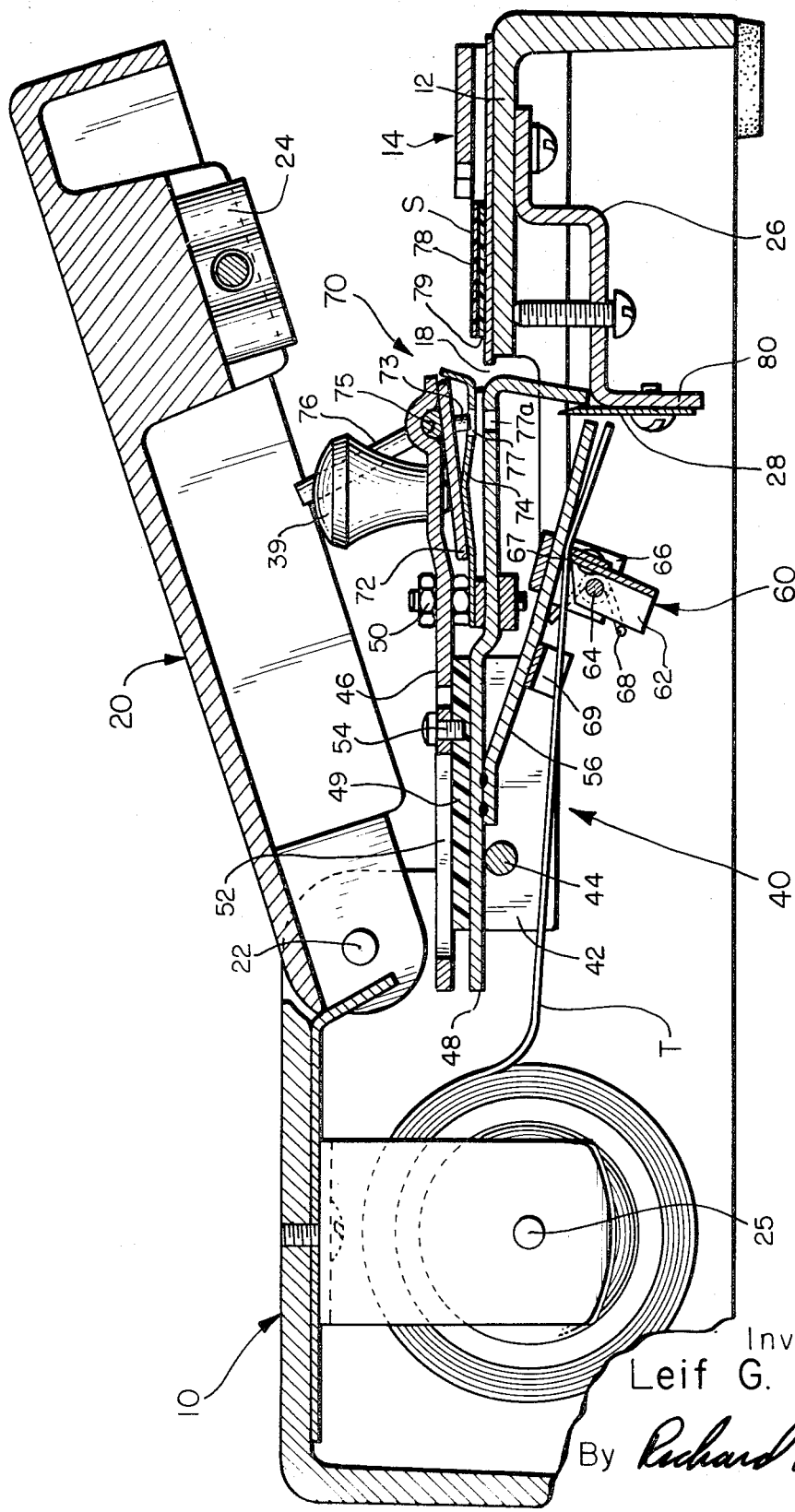
FIG. 3 is a vertical section taken on line 3—3 of FIG. 1.

Referring now to the drawings, and particularly to FIGS. 1 and 3, it will be seen that the splicing device illustrated therein comprises a housing structure or base, indicated generally at 10, which includes a horizontal surface or deck 12 at the forward side thereof on which is disposed a carriage 14 extending transversely across the deck and mounted on rods 15 carried by base 10 for reciprocal sliding movement rearwardly and forwardly on said deck.

Carriage 14 may be provided with a pair of clamping elements 16 for securing to the carriage, in alignment with each other and with their adjacent ends in abutting relation, a pair of strips S of motion picture film, or the like, to be spliced together.

Although the drawings and description of the application illustrate the device as used for splicing motion picture film, it will be understood that the device is equally suitable for use in splicing magnetic tape or strips of other materials.

Figure 2:
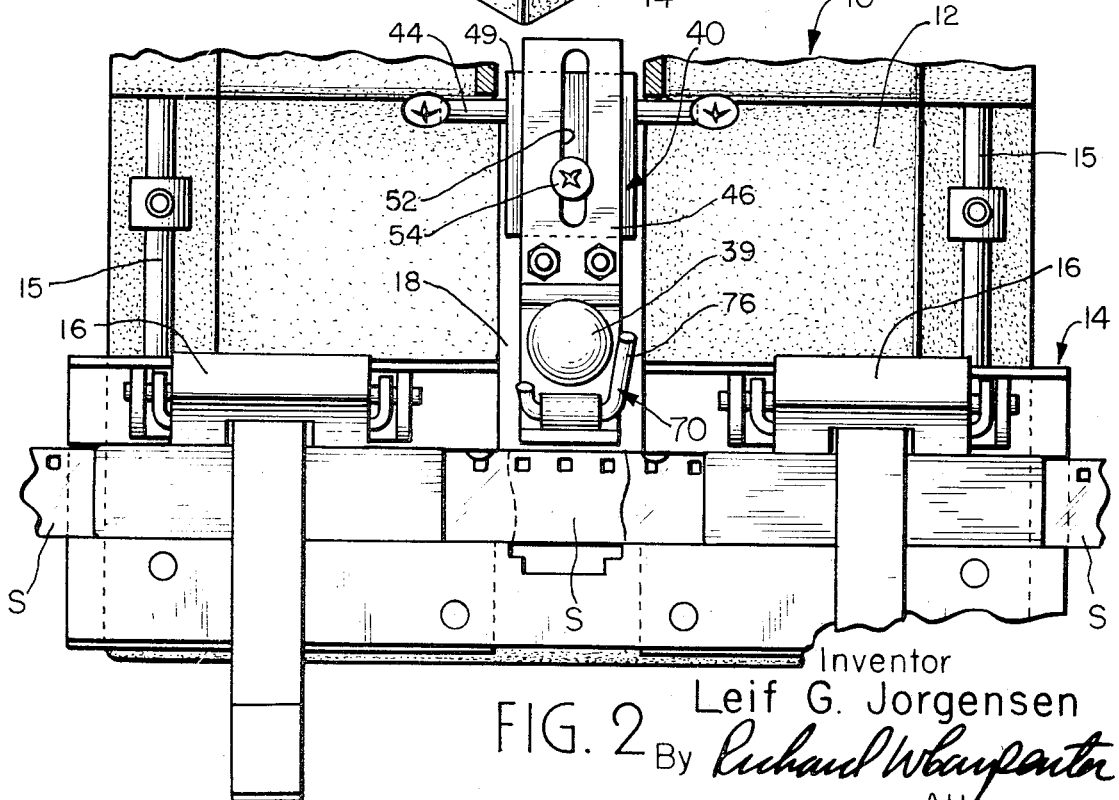
FIG. 2 is a horizontal section taken on line 2—2 of FIG. 1.

As best seen in FIGS. 2 and 3, there is provided an opening 18 which extends through deck 12 and which is located centrally of the deck and rearwardly of carriage 14. Opening 18 provides a means for pulling the tape through the deck in a manner described later in the specifications.

Still referring to FIGS. 1 and 3, it will be seen that an elongated cutting arm 20 is pivotally mounted, for rotation in a vertical plane, at its rearward end by pivot 22 to base 10 at a location spaced rearwardly from carriage 14 and in alignment with deck opening 18. On the under side of the forward end of cutting arm is mounted a removable blade 24 which may be used to cut the ends of film strips S in a manner hereinafter described.

As best seen in FIG. 3 a roll of transparent adhesive tape T is carried in the base 10 rearwardly of opening 18 on a spindle 25.

Also shown in FIG. 3 is a tape cutting arm 26 which has its forward end mounted on the base under deck 12 and which has, removably mounted on its rearward end, a tape cutting blade 28 which functions in a manner hereinafter described.

The essential feature of this invention resides in the tape dispensing member or mechanism, indicated generally at 40, which is operable to dispense a predetermined length of tape T from the roll by depositing the free end of the tape on the film strips S, which are clamped on the carriage, and then cutting the tape at the proper location to provide the length required to cover exactly both sides of the film strips.

As best seen in FIG. 3, tape dispensing mechanism 40 includes a channel shaped mounting bracket 42 pivotally mounted at its rearward end by pin 44 to base 10, at a location rearward of opening 18 and almost directly under the rear end of cutting arm 20.

Dispenser 40 includes a pair of generally parallel, elongated, relatively thin, upper and lower arms 46 and 48, respectively, which have their rearward portions positioned immediately above and below the central portion or bridge 49 of bracket 42 and which are connected to each other intermediate their ends and forwardly of bracket 42 by one or more bolts 50. At their forward ends arms 46 and 48 define a space 51 therebetween. At its forward extremity lower arm 48 presents a downwardly extending guide portion 80.

Arms 46 and 48 are disposed for sliding movement together relative to bracket 42. Their forward movement relative to the bracket is limited by a pin 54 and slot 52 connection between upper arm 46 and bracket central portion 49, and their rearward movement may be limited by bolts 50 or by the length of slot 52.

The amount of travel of arms 46 and 48 is a critical factor in the operation of the dispenser as hereinafter described.

An essential feature of dispenser 40 is a tape retainer mechanism, indicated generally at 60, which is mounted on the underside of an elongated applicator or pressure finger 56 which has its rearward end formed integrally with or secured to the underside of lower arm 48 and which is disposed to slope downwardly and forwardly therefrom.

Retainer mechanism 60 which operates in the manner of a ratchet allowing the tape to be moved only in one direction relative to lower arm 48 of dispenser mechanism 30, includes a pawl 62 which is pivotally connected by a horizontal pin 64 to a mounting arm 66 carried by finger 56 of lower arm 48. A wire spring 68, also mounted on pin 64, is operable to bias the preferably straight upper gripping edge 67 of pawl 62 against the underside of finger 56, with the tape interposed therebetween as hereinafter described.

Finger 56 may also be provide with one or more integral depending guides 69 (only one being shown in the drawings) which serve to keep the tape in proper alignment after it leaves the roll.

The film splicer may be used to splice film with or without sprocket holes, and, if it is to be used with film having sprocket holes, it is necessary to provide a mechanism for punching a hole through the film and tape after the splice has been completed.

Perforating mechanism, indicated generally at 70, is best seen in FIG. 3 of the drawings as part of the tape dispenser mechanism 30.

Figure 4A:
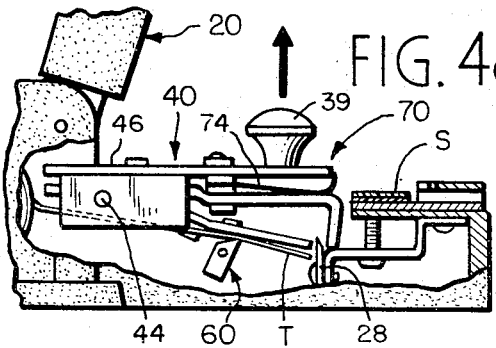
FIGS. 4a–4h are views similar to FIG. 3, with a portion of the structure removed, illustrating the operation of the tape dispensing mechanism of the film splicer illustrated in the other views.
Figure 4E:
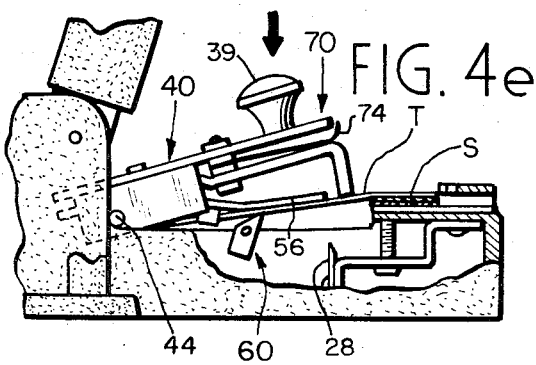
Figure 4B:
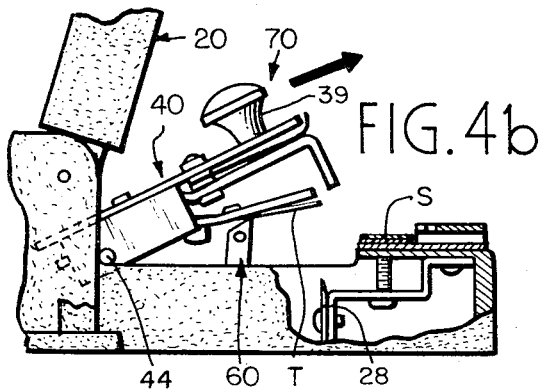
Figure 4F:
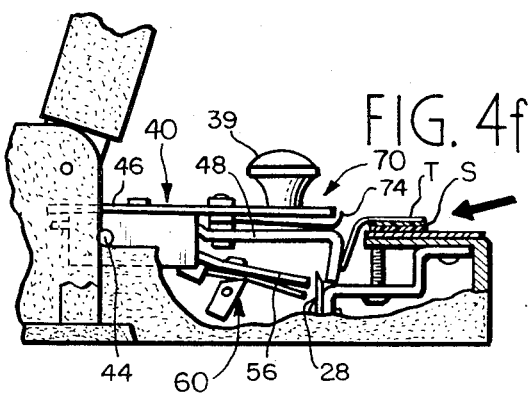
Figure 4C:
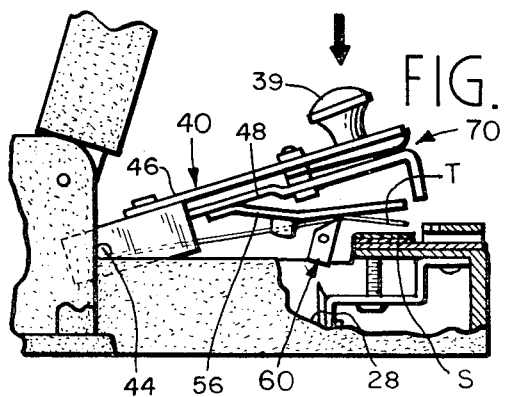
Figure 4G:
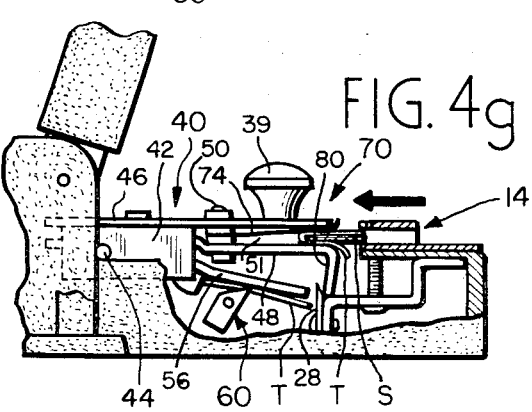
Figure 4D:
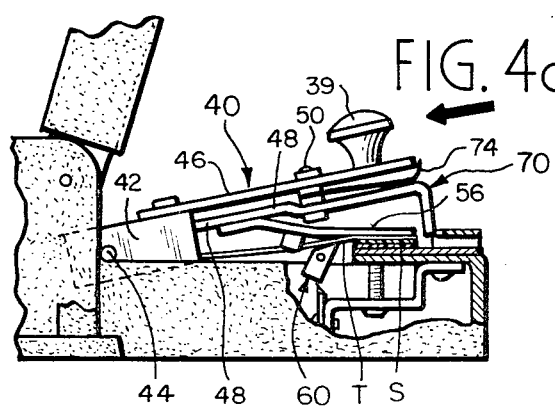
Figure 4H:
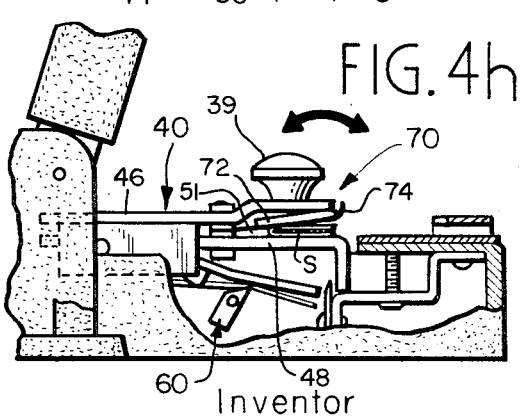

Perforating mechanism 70 includes a relatively thin flat punch plate 72 illustrated only in FIGS. 3 and 4h, interposed between forward portions of upper and lower dispenser arms 46 and 48, having an integral punch pin 73 projecting downwardly therefrom.

Punch plate 72 is normally biased upwardly to an inoperative position by a leaf spring 74 interposed between punch plate 72 and lower arm 48 in space 51. Actuation of the punch plate is achieved by a crank lever 76 having a portion journalled in a recess 75 in the underside of upper arm 46. Leaf spring 74 and arm 48 are provided with openings 77 and 77a, respectively, which are aligned with pin 73 to receive the pin when it is depressed.

Mounted on the central portion of deck 12, between the film clamps 16, is an anvil plate 78 and a cushion or pad 79 interposed between plate 78 and the upper surface of the deck.

Now to describe the operation of the device, its operation is best illustrated in FIGS. 3 and 4a–4h.

In order to effect a splice between adjacent film ends it is desirable that their corresponding edges abut each other. If the film has been broken, as is usually the case, it is first necessary to trim adjacent edges of the film.

After the film strips have been secured on the carriage 14 by clamps 16, with their adjacent ends slightly overlapped, cutting arm 20 is dropped and its own weight will serve to drive film cutting blade 24 through the film strips over anvil plate 78.

After this has been done the trimmed ends of the film are removed and the remaining strips are then in clean, snug abutting relation.

At this point tape dispenser handle or knob 39 is lifted and the dispensing mechanism 40 is pulled forward from the position shown in FIG. 4a through the positions of FIGS. 4b and 4c to the position of FIG. 4d.

It is assumed that the dispenser has already been used to effect a previous splice so the tape is in the position shown in FIG. 4a when the forward movement of the dispenser is started, with the forward edge of the tape in alignment with the forward end of dispenser lower arm finger 56. It was in this position that the tape was severed from the roll on the previous splice.

As the dispenser is moved forward it will be appreciated that spring 68 urges pawl 62 in a counter-clockwise direction so that pawl upper gripping edge 67 grips the tape tightly against the underside of finger 56 so the tape will be pulled off the roll and pulled forward as the entire dispenser moves forward.

When the forward movement of the dispenser is stopped, by the engagement between pin 54 and the rear end of slot 52, the forward edge of tape T is aligned with the forward side edges of the film strips S, as shown in FIG. 4d. The length of travel of the dispenser may be adjusted to accomplish this so an appropriate length of tape will be used for the splice.

After the dispenser has been moved to the position of FIG. 4d the dispenser is depressed to apply the tape to the film strips, and then the dispenser 40 is moved rearwardly through the positions illustrated in FIGS. 4e and 4f.

Because of the arrangement and disposition of pawl 62 and spring 68 the pawl permits the dispenser to ride rearward without dragging the tape along. Thus the forward end of the tape remains adhered to the film strips on the carriage, as seen in FIG. 4e.

When the rearward movement of the dispenser is stopped, either by the engagement between pin 54 and the forward edge of slot 52, or by engagement between bolts 50 and the forward edge of dispenser mounting bracket horizontal portion 49, the dispenser automatically drops or is urged to its lowermost position as shown in FIG. 4f where a predetermined length of tape approximately twice the width of the film strips is severed by cutting blade 28. An integral downward extension or guide 80 at the forward end of lower arm 48 serves to engage the tape to tension it over the cutting blade.

After the tape has been cut to the desired predetermined length with the free rearward end of the cut tape hanging down against the front side of extension 80 of arm 48, as illustrated in FIG. 4f, the carriage 14 is moved from its forwardmost position, as shown in FIG. 4f to its rearwardmost position, as shown in FIG. 4h to carry the film strips and tape into space 51 and thereby wrap the pre-cut length of tape around the upper and lower surfaces of the film strip ends to effect the splice.

Thus, it will be seen that after the film strips have been clamped in position on the carriage and the edges trimmed, the operator merely grasps the tape dispenser knob 39 and pulls the dispenser to its forwardmost position and pushes it down to apply the tape to the film by means of finger 56, as shown in FIG. 4d. The operator then pushes the dispenser rearwardly as far as it will go, to withdraw the proper length of tape, and then downwardly to sever the tape from the roll.

The operator then pushes the carriage to its rear position to form the splice. If it is desired to perforate the tape and film lever 76 is pulled forward to drive pin 73 through the tape and film. Then the operator pulls the carriage and removes the spliced film.

Thus, it will be understood that the action of the novel pawl and spring mechanism of the tape dispenser, in co-operation with the cutting mechanism, serves to automatically deliver and apply to the film an appropriate length of tape from a roll for the automatic banding or splicing operation which is accomplished merely by pushing the carriage rearwardly to urge the tape and film to be drawn into space 51 between the lower surface of leaf spring 74 and the upper surface of dispenser lower arm 48, as best seen in FIG. 4g.

We claim:

1. A device for splicing adjacent ends of a pair of strips of material, such as motion picture film, by wrapping around both sides of said strips a band of adhesive tape from a roll, comprising:
    (a) a base including a deck with a centrally disposed opening extending therethrough;
    (b) means for mounting a roll of adhesive tape on said base;
    (c) cutting means carried by said base beneath said deck for severing from said roll a length of tape after a free end of tape has been applied to upper surfaces of strips to be spliced;
    (d) a carriage, for retaining and supporting strips to be spliced, movably mounted on said deck for movement rearwardly and forwardly of the deck between first and second positions adjacent to said deck opening;
    (e) a tape dispensing member movably mounted on said base for movement forwardly and rearwardly toward and away from said carriage, said dispensing member including:
    (i) clamp means for gripping a free end of said tape and pulling it from said roll as said carriage is moved forward;
    (ii) pressure means for applying said free end of the tape to upper surfaces of said strips while said strips are on said carriage and said carriage and dispensing members are each in a forward position;
    (iii) generally vertically disposed guide means for pushing said tape against said cutting means to sever a length of tape from the roll, and also for engaging a lower end of said length of tape, after it has been severed from the roll, to position the length of tape for wrapping about said strips;

(iv) a pair of generally vertically spaced, horizontally disposed elements defining therebetween a relatively narrow space for receiving said strips and said tape, as said carriage is moved to its rearward position, and thereby causing said length of tape to be wrapped around said strips.

2. A device according to claim 1, wherein said dispensing member is also mounted for pivotal movement in a vertical plane for applying said free end of tape to said strips and for pushign said tape against said cutting means.

3. A device according to claim 1, wherein said clamp means includes:
(i) a pawl type element presenting an edge arranged and disposed to clamp said tape against a surface of said dispensing member;
(ii) spring means operable to bias said pawl type element toward the surface of said dispensing member.

4. A device according to claim 1, wherein said dispensing member includes apparatus for perforating both layers of said wrapped tape and said strips after the former has been wrapped about the latter.

References Cited

UNITED STATES PATENTS

| | | | |
|---|---|---|---|
| 3,553,056 | 1/1971 | Cole et al. | 156—505 |
| 3,510,384 | 5/1970 | Quarve | 156—505 |
| 3,523,057 | 1/1971 | Blackman | 156—505 |
| 3,050,107 | 8/1962 | Barry et al. | 156—506 X |

FOREIGN PATENTS

| | | | |
|---|---|---|---|
| 855,321 | 11/1960 | Great Britain | 156—505 |

PHILIP DIER, Primary Examiner

U.S. Cl. X.R.

156—506, 510